United States Patent
Lee et al.

(10) Patent No.: US 10,227,045 B2
(45) Date of Patent: Mar. 12, 2019

(54) INSIDE MIRROR ASSEMBLY OF VEHICLE

(71) Applicants: Hyundai Motor Company, Seoul (KR); Kia Motors Corporation, Seoul (KR)

(72) Inventors: Jin Hee Lee, Seoul (KR); Young Sub Oh, Suwon-si (KR); Bock Cheol Lee, Suwon-si (KR); Nak Kyoung Kong, Seongnam-si (KR); Hyun Sub Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 753 days.

(21) Appl. No.: 14/843,678

(22) Filed: Sep. 2, 2015

(65) Prior Publication Data

US 2016/0114730 A1    Apr. 28, 2016

(30) Foreign Application Priority Data

Oct. 22, 2014   (KR) .................. 10-2014-0143210

(51) Int. Cl.
  *B60R 1/08*   (2006.01)
  *B60R 1/04*   (2006.01)
(52) U.S. Cl.
  CPC ................ *B60R 1/086* (2013.01); *B60R 1/04* (2013.01)

(58) Field of Classification Search
  CPC .................. B60Q 1/2665; B60Q 3/258; G02B 2027/0118; G02B 27/0101
  See application file for complete search history.

(56) References Cited

U.S. PATENT DOCUMENTS

| 6,168,277 | B1 | 1/2001 | Kanazawa | |
| 2006/0164230 | A1* | 7/2006 | DeWind | B60K 35/00 340/461 |
| 2006/0268561 | A1* | 11/2006 | DeLine | B60Q 1/2665 362/494 |
| 2010/0321758 | A1* | 12/2010 | Bugno | B60R 1/088 359/267 |

FOREIGN PATENT DOCUMENTS

| JP | 10-086750 A | 4/1998 |
| JP | 2009-241748 A | 10/2009 |
| KR | 10-1998-0025524 A | 6/1999 |
| KR | 1999-0027549 U | 7/1999 |
| KR | 1999-0028649 U | 7/1999 |
| KR | 10-2012-0099671 | 5/2012 |

* cited by examiner

*Primary Examiner* — Robert E. Tallman

(57) ABSTRACT

An inside mirror assembly of a vehicle, the assembly having an improved structure capable of implementing reflective surfaces of a day mode and a night mode according to light reflectivity. The mirror assembly has a simplified mechanism for operating a tilting reflective plate by adopting two pivot shafts to it. The tilting reflective plate is prevented from vibrating, and play is prevented using the tensile force of a spring.

12 Claims, 7 Drawing Sheets

- Day mode -

- Night mode -

FIG.1

(PRIOR ART)

FIG.2

(PRIOR ART)

- Day mode -

FIG.7A

- Night mode -

FIG.7B

- Day mode -

FIG.8A

- Night mode -

FIG.8B

INSIDE MIRROR ASSEMBLY OF VEHICLE

CROSS-REFERENCE TO RELATED APPLICATION

This application claims under 35 U.S.C. § 119(a) the benefit of Korean Patent Application No. 10-2014-0143210, filed on Oct. 22, 2014, the entire contents of which are incorporated herein by reference.

BACKGROUND (a) Technical Field

The present invention relates to an inside mirror assembly of a vehicle. More particularly, the invention relates to an inside mirror assembly of a vehicle having an improved structure capable of implementing reflective surfaces of a day mode and a night mode, selectively, according to light reflectivity.

(b) Background Art

In general, an inside mirror (also called a room mirror) of a vehicle is arranged to guarantee a view to a rear passenger seat and a rear side, and is mounted on the seal at the upper side of a boundary between a driver's seat and a front passenger seat such that an angle thereof is adjustable.

The inside mirror assembly includes a housing assembled to the seal by a ball joint and a mirror glass mounted on the front side of the housing to reflect light.

Since a majority of mirror glasses has a flat reflection side of a prescribed thickness, light emitted from headlamps (especially, high beams) of following vehicles is directly reflected so that the reflected light tends to blind the driver. To prevent this, a frameless inside mirror assembly is adopted to adjust light reflectivity.

The existing frameless inside mirror assembly will now be described with reference to FIGS. 1 and 2 as follows.

Figure 1:
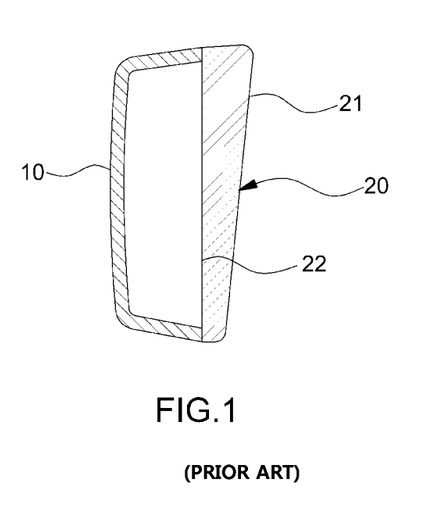
FIGS. 1 and 2 are is sectional views showing an existing inside mirror assembly.
Figure 2:
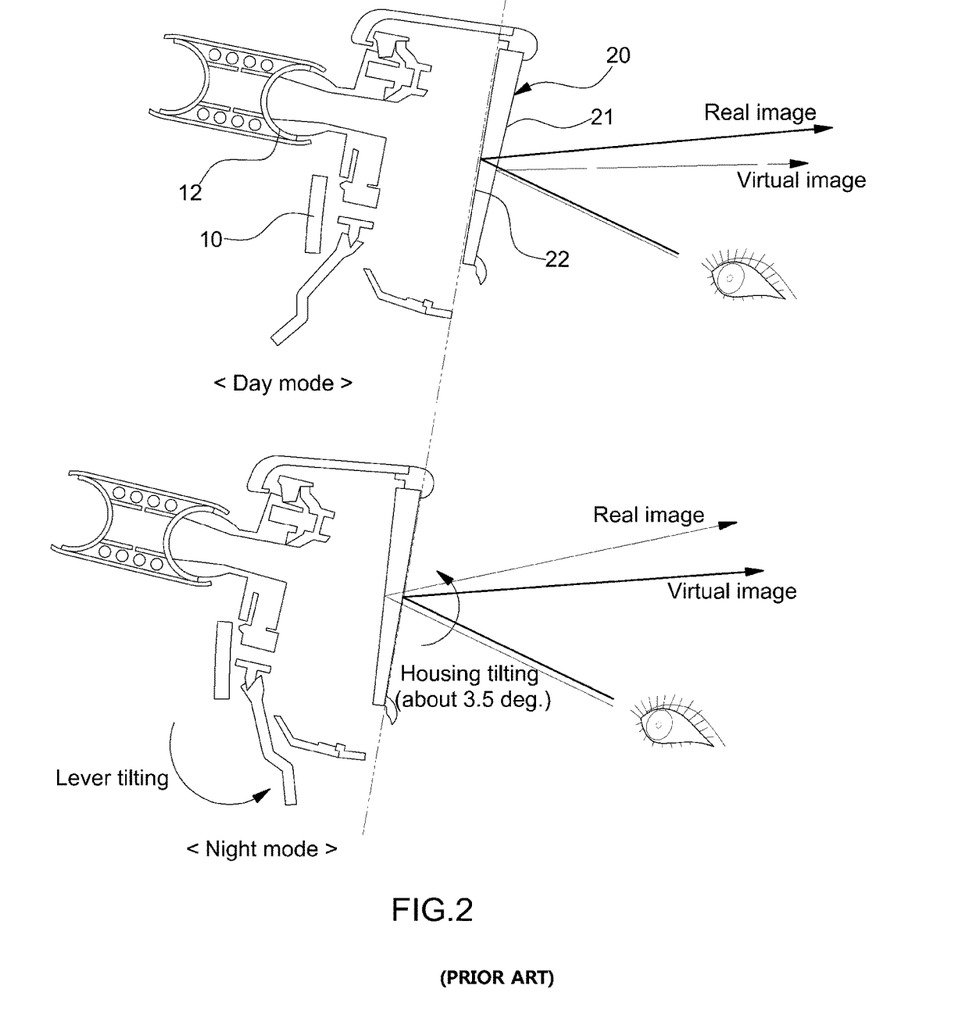

As shown in FIGS. 1 and 2, a reference numeral 10 indicates a housing 10 of the mirror assembly and a reference numeral 20 indicates a prism glass.

A frameless prism glass 20 is fixed to a front opening of the housing 10, while the prism glass 20 becomes gradually thinner extending down from the upper side.

In this case, the housing 10 is mounted to adjust an angle thereof by a ball joint 12, and a lever 14 is connected to the ball joint 12 to adjust an angle of the housing 10.

The front surface of the prism glass 20 is a first reflective surface 21 implementing a night reflection mode, and a rear surface thereof is a second reflective surface 22 coated with a reflective material implementing a day reflection mode.

As shown in FIG. 2, in the day reflection mode, a rear side object and rear side light are reflected by the second reflective surface 22 of the prism glass 20 such that a driver may see the rear side object reflected from the second reflective surface 22, and simultaneously light reflected from the second reflective surface 22 enters the driver's eyes.

On the other hand, in the night reflection mode, when the lever 14 is manipulated to lower the light reflectivity and is moved downwardly about the ball joint 12 to tilt the housing 10 upward (about 3.5 degrees), the prism glass 20 is tilted at the same angle with the housing 10 and the rear side object and the rear side light are reflected from the first reflective surface 21 of the prism glass 20.

As such, the prism glass 20 is tilted to adjust a reflection angle in the night reflection mode so that the light entered from the rear side object (especially, the light of headlamps of following vehicles) is reflected by the first reflective surface 21 at a lowered reflectivity, preventing a driver's eyes from being blinded.

However, the above-described existing inside mirror assembly has drawbacks as follows:

First, when the rear side object is reflected from the first and second reflective surfaces of the prism glass when in the day reflection mode and the night reflection mode, since a condition in which a real image and a virtual image on the prism glass are overlapped arises due to a characteristic of the prism glass, a driver often recognizes the rear side object but experiences eye discomfort Second, there is inconvenience in that a driver normally does not recognize the inside mirror assembly as having been tilted during travelling when in a day reflection mode on the day after travelling in the night reflection mode (although a driver may recognize the changed position of the housing because of the tilted housing), and often uses the inside mirror assembly by adjusting the housing. However, he/she eventually recognizes the changed position of the lever during night travelling to again adjust the housing.

To solve these drawbacks, this applicant previously filed Korean Patent Application 10-2014-0057030, that is, an "inside mirror assembly of a vehicle in which a fixed reflective plate fixed to a front opening of a housing and a tilting reflective plate disposed parallel to the rear side of the fixed reflective plate in a day reflection mode and tilted in the night reflection mode, wherein the fixed reflective plate and the tilting reflection plate are disposed before and after the housing such that the image overlapping in which a virtual image and a real image are overlapped with each other in the day reflection mode is reduced and in which a tilting trace for switching the day reflection mode into the night reflection mode and vise versa is always uniform, and in which a driver can recognize the reflection mode intuitively."

Figure 3:
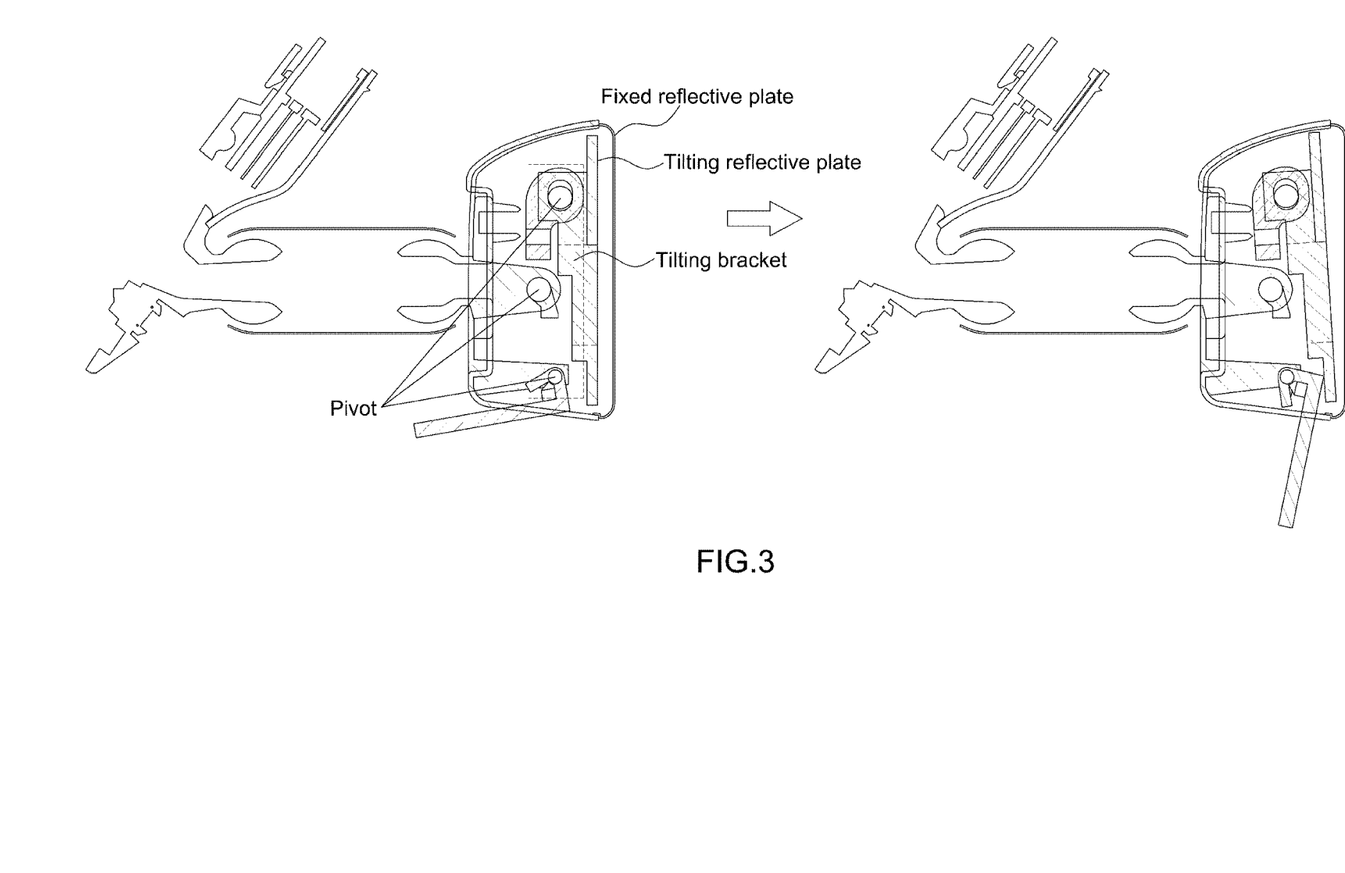
FIG. 3 is a sectional view showing another existing inside mirror assembly.

However, as shown in FIG. 3 herein, a slot hole is adopted in a portion to which the tilting reflection plate and a tilting bracket are connected for a tilting trace, in particular, three more pivot shafts with different traces are used, and a linkage structure to which respective pivot shaft are connected is complex, resulting in play.

SUMMARY OF THE DISCLOSURE

Accordingly, the present invention has been made in an effort to solve the above-mentioned problems, and it is an object of the present invention to provide an inside mirror assembly of a vehicle for simplifying an operating mechanism of a tilting reflective plate, and preventing the tilting reflective plate from vibrating and play from being generated.

In accordance with an aspect of the present invention, there is provided an inside mirror assembly of a vehicle including: a housing having an opening formed in its front side; a fixed reflective plate fixed in the opening of the housing; a tilting reflective plate tilted in the housing, disposed parallel to the rear side of the fixed reflective plate in a day reflection mode or disposed such that an upper end thereof is tilted rearward by an angle about the lower end to reduce light reflectivity in the night reflection mode; and a tilting mechanism connected to the tilting reflective plate and mounted inside and outside of the housing to adjust a tilting angle of the tilting reflective plate;

wherein the tilting mechanism includes: a tilting plate bonded to the rear side of the tilting reflective plate; a tilting linkage having an upper end hinged to the upper side of the tilting plate and a lower end formed with a spring coupling unit; a spring engaged with the tilting linkage and pivotally supported by spring supporting ends formed in the housing; and a tilting lever moving the lower end of the tilting linkage forward and rearward.

The inside mirror assembly of a vehicle according to the present invention has the following effects:

First, an operating mechanism of a tilting reflective plate may be simplified by adopting two pivot shafts to tilt the tilting reflective plate; and second, the tilting reflective plate may be prevented from vibrating during tilting and play from being generated after operation, using the tensile force of a spring.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail so that those skilled in the art to which the present invention pertains can easily carry out the present invention.

The present invention, in accord with embodiments thereof, provides an inside mirror assembly for enabling only a real image of a rear side object to be seen from an inside mirror without a virtual image during day travelling, and for lowering reflectivity of light (for example, light from headlamps of following vehicles) entering from the rear side during night travelling to prevent a driver's eyes from being blinded.

To this end, an inside mirror assembly according to an embodiment of the present invention includes a fixed transparent reflective plate fixed to a front opening of a housing and a tilting reflective plate disposed parallel to the rear side of the fixed reflective plate when in a day reflection mode, or tilted from the rear side of the fixed reflective plate by an angle when in a night reflection mode.

Figure 4:
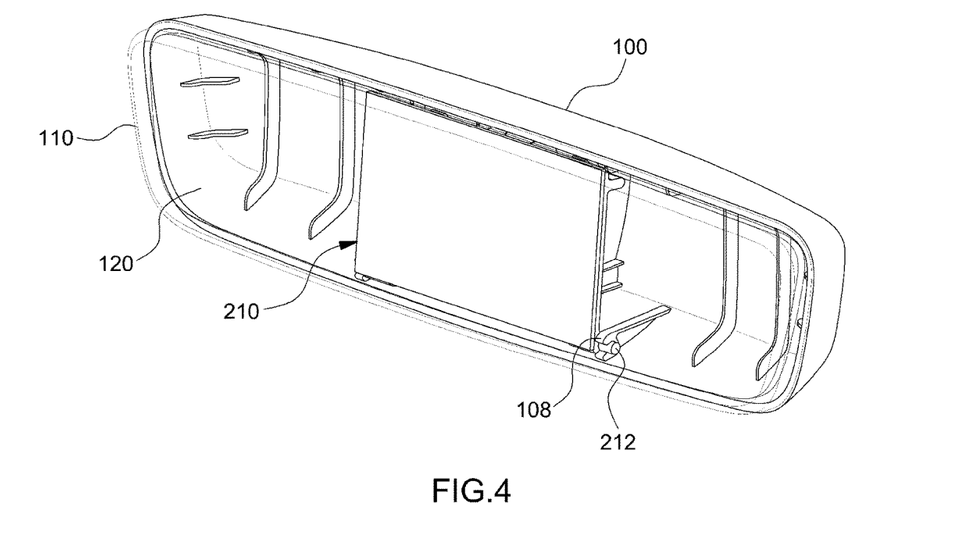
FIG. 4 is a perspective view showing an entire outer appearance of an inside mirror assembly according to an embodiment of the present invention.
Figure 5:
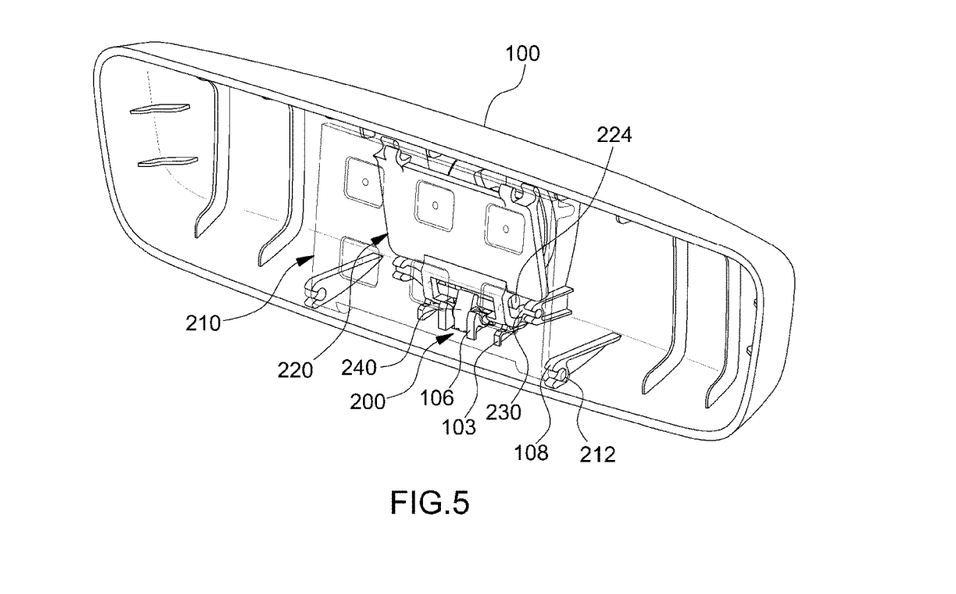
FIG. 5 is a perspective view showing a front outer appearance of the inside mirror assembly according to an embodiment of the present invention excluding a fixed reflective plate and a tilting reflective plate.
Figure 6:
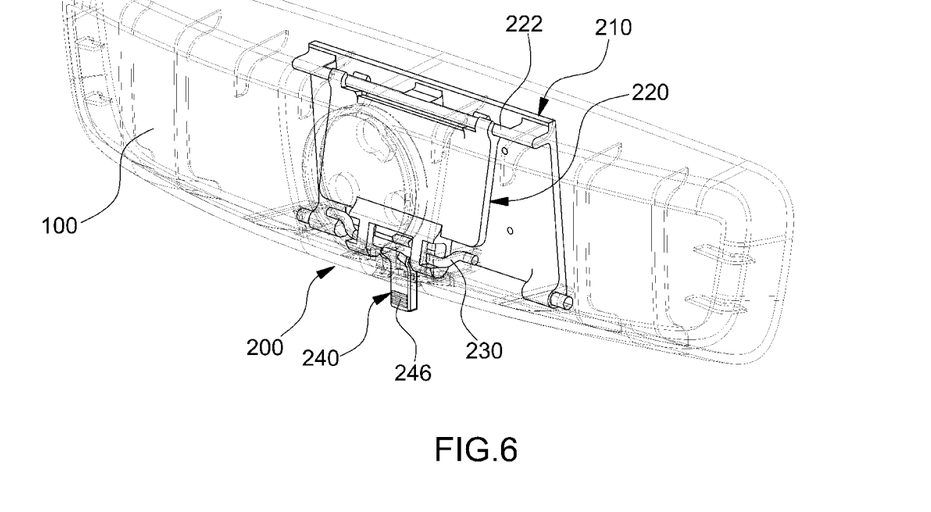
FIG. 6 is a perspective view showing a rear outer appearance of the inside mirror assembly according to an embodiment of the present invention.

FIG. 4 is a perspective view showing an entire outer appearance of an inside mirror assembly according to an embodiment of the present invention. FIG. 5 is a perspective view showing a front outer appearance of the inside mirror assembly according to an embodiment of the present invention excluding a fixed reflective plate and a tilting reflective plate. FIG. 6 is a perspective view showing a rear outer appearance of the inside mirror assembly according to an embodiment of the present invention.

Reference numeral 100 of FIGS. 4 to 6 indicates a mirror housing of the inside mirror assembly.

The housing 100 is coupled on a seal above a boundary portion between a driver's seat and a front passenger seat by a ball joint, and has an opened front side.

A transparent fixed reflective plate 110 is fixed in a front opening of the housing 100.

More specifically, the fixed reflective plate 110 is made of a transparent plastic of a prescribed thickness and has four edges bent curved backward.

In this case, the four edges of the fixed reflective plate 110 are integrally bonded to the front opening of the housing 100 to form a frameless structure.

A tilting reflective plate 120 is mounted in the housing 100 and is tilted by a tilting mechanism 200.

Particularly, the tilting reflective plate 120 is made of a plastic material, a front side of which is coated with a reflective material, having a prescribed thickness, and enables a driver to see a rear side object clearly.

By doing so, the tilting mechanism 200 is manipulated such that the tilting reflective plate 120 is disposed parallel to the rear side of the fixed reflective plate when in a day reflection mode, and an upper end is tilted about a lower end rearward by an angle to reduce the light reflectivity when in a night reflection mode.

Configuration of the tilting mechanism will be described with reference to FIGS. 5, 7A and 7B.

The tilting mechanism 200 is connected to the tilting reflective plate 120 and is mounted to the inside and the outside of the housing 100 to adjust a tilting angle of the tilting reflective plate 120.

To this end, a tilting reflective plate 120 of the tilting mechanism 200 is integrally bonded to a rear side of the tilting reflective plate 120, and simultaneously the tilting reflective plate 120 is tilted by the same angle during the tilting of the tilting reflective plate 120.

Hinge pins 212 are formed at both lateral sides of the lower end of the tilting reflective plate 120, and are hinged to hinge ends 108 formed on the bottom of the housing 100 so that the upper end of the tilting reflective plate 120 pivots about the hinge pins 212 at the lower ends.

Moreover, a tilting linkage 220 is connected to the rear side of the tilting reflective plate 120 to pivot the tilting reflective plate 120 by an angle.

The upper end of the tilting linkage 220 is hinged by a pivot shaft 222 of the rear upper side of the tilting reflective plate 120, and the lower end thereof is movable forward and rearward by a prescribed distance to move the center of the pivot shaft 222.

More specifically, guide ends 103, upwardly inclined in the front direction, are integrally formed on the bottom of the housing 100 such that the tilting linkage 220 is lifted during the forward movement of the tiling linkage 220 and lowered during the rearward movement of the tilting linkage 220. Thus, the lower ends of the tilting linkage 220 are movable forward and rearward along the guide ends 103 by a prescribed distance to shift the center of the pivot shaft 222.

In this case, locking steps 104 are further integrally formed on the upper sides of the guide ends 103 to provide to a user an operative feeling when the user manipulates the tilting linkage 220 forward and rearward.

The curved lower end of the tilting linkage 220 passes over the locking steps 104 and provides to a user the feeling of pivoting during the forward and rearward movements along the guide ends 103.

A spring coupling slot 224 is formed in the lower side of the tilting linkage 220, a spring 230 is inserted into the spring coupling slot 224, and both ends of the spring 230 are pivotally supported by spring supporting ends 102 formed on the wall of the housing 100.

The spring 230 is divided into a linear rod 232 coupled with a lever 240 to pivot the tilting linkage 220 and supported rods 234 bent twice at both ends of the linear rod 232 and pivotally supported by the spring supporting ends integrally formed on the wall of the housing 100.

The tilting lever 240 is a lever to pivot the tilting linkage 220 and includes a coupling recess 244, into which the spring 230 is inserted, formed in the upper side of the tilting lever 240, lever hinges 242 integrally protruding from the upper end of the spring 230, and a handle 246 extending outwards through the bottom of the housing 100 from the lower side of the spring 230. The coupling recess 244, the lever hinges 242, and the lever handle 246 are integrally formed with each other.

The housing 100 includes lever hinge supporting ends 106, into which the lever hinges 242 of the tilting lever 240 are inserted, integrally formed on the bottom of the housing 100. The lever hinges 242 serve as a pivoting center of the tilting lever 240.

Using modes of the inside mirror assembly according to an embodiment of the present invention configured as described above will now be described.

Day Reflection Mode

Figure 7A:
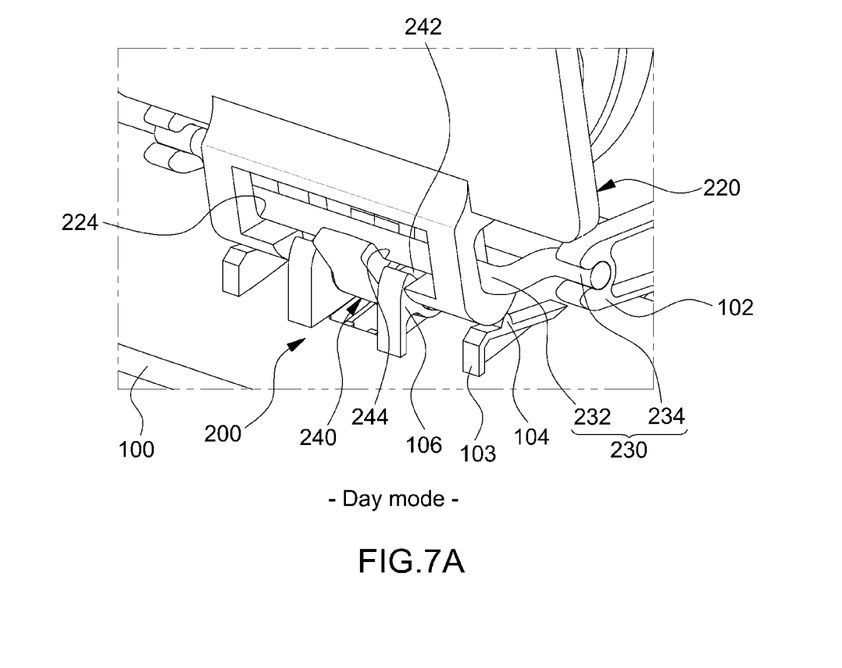
FIGS. 7A and 7B are partial perspective views showing operative states of the inside mirror assembly according to an embodiment of the present invention when in a day mode and in a night mode, respectively, and a coupling relationship among a tilting linkage, a spring, and a tiling lever of the inside mirror assembly, respectively.
Figure 8A:
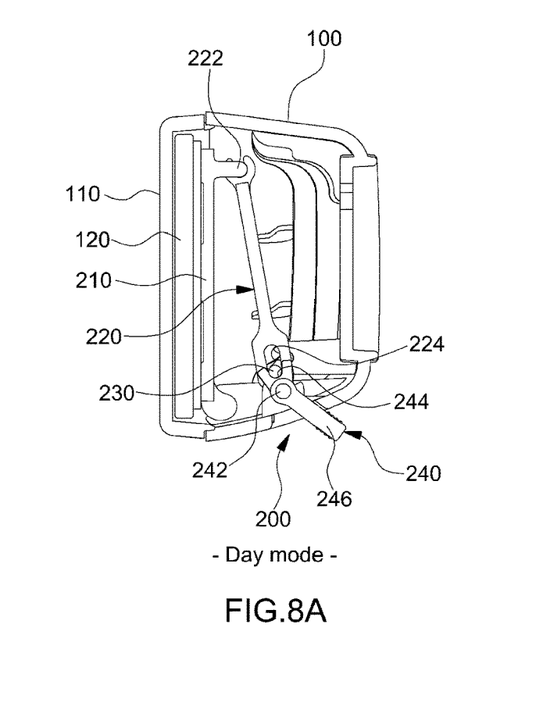
FIGS. 8A and 8B are sectional views during operative states of the inside mirror assembly according to an embodiment of the present invention when in a day mode and in a night mode, respectively.

FIGS. 7A and 8A are partial perspective views showing operative state of the inside mirror assembly according to an embodiment of the present invention when in a day mode.

In the day reflection mode, the tilting reflective plate 120 is disposed parallel to the rear side of the transparent fixed reflective plate 110 fixed in the front opening of the housing 100 to make a real image of the rear side object appear on the tilting reflective plate 120 without a virtual image, so that a driver may be provided with a clean rear side view.

To this end, when the tilting lever 240 positioned at the night reflection mode is pushed to the rear side of the housing 100 (in a direction where a windshield glass is located), the spring 230 coupled in the coupling recess 244 of the tilting lever 240 pivots forward by about 90 degrees about the both ends supported by the spring supporting ends 102.

At the same time, as shown in FIG. 7A, since the spring 230 is inserted into the spring coupling slot 224 formed in the lower end of the tilting linkage 220, the lower end of the tilting linkage 220 is gradually lifted forward along the guide ends 103 upwardly inclined in the front direction due to the forward pivoting of the spring 230.

The lower end of the tilting linkage 220 is lifted along the guide ends 103 and passes over the locking steps 104 to provide an operative feeling to a user.

As the lower end of the tilting linkage 220 is gradually lifted forward along the upwardly inclined guide ends 103, the upper end of the tilting linkage 220 moves upwardly and pushes the tilting reflective plate 120 forward.

More specifically, when the upper end of the tilting linkage 220 moves upwardly, the upper end of the tilting reflective plate 120 connected by the tilting linkage 220 and the pivot shaft 222 pivots forward by an angle about the hinge pins 212 in the lower end due to the pushing force of the tilting linkage 220.

Thus, as shown in FIG. 8A, the tilting reflective plate 120 bonded to the tilting reflective plate 120 is disposed parallel to the rear side of the fixed reflective plate 110.

As such, the tilting reflective plate 120 is disposed parallel to the rear side of the transparent fixed reflective plate 110 fixed in the front opening of the housing 100 in the day reflection mode, and a real image of the rear side object appears on the tilting reflective plate 120 without a virtual image and is reflected by the tilting reflective plate 120, so that a driver may see the rear side object clearly.

Night Reflection Mode

Figure 7B:
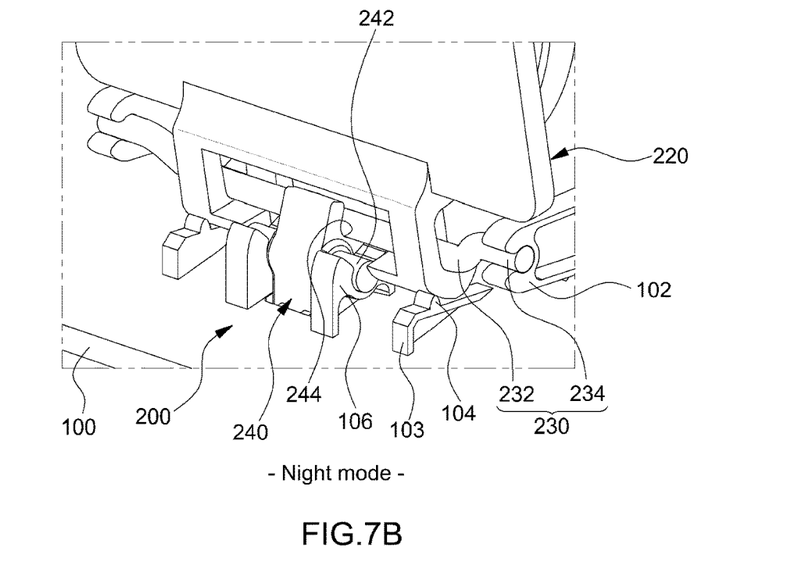
Figure 8B:
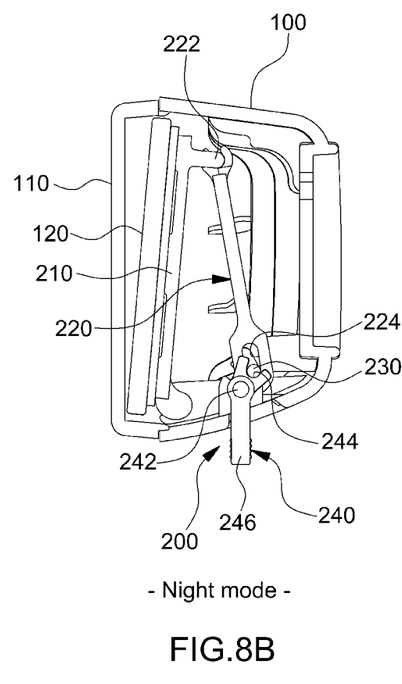

FIGS. 7B and 8B are sectional views showing operated states of the inside mirror assembly according to an embodiment of the present invention in a night mode.

The tilting reflective plate is adjusted to tilt rearward by an angle from the fixed reflective plate in the night reflection mode, reflectivity of light (for example, light from the headlamps of following vehicles) entering the tilting reflective plate so that a driver may be prevented from being blinded.

To this end, if the tilting lever 240 located in the day reflection mode is pulled forward (inward of the vehicle), the spring 230 coupled in the coupling recess 244 of the tilting lever 240 pivots rearward about both ends supported by the spring supporting ends 102.

At the same time, since the spring 230 is inserted into the spring coupling slot 224 formed in the lower end of the tilting linkage 220, the lower end of the tilting linkage 220 is gradually lowered rearward along the downwardly inclined guide ends 103 by rearward pivoting of the spring 230.

In this case, the lower end of the tilting linkage 220 is lowered along the guide ends 103 and passes over the locking steps 104 to provide to a user an operative feeling.

Next, as shown in FIG. 7B, the lower end of the tilting linkage 220 is gradually lowered rearward along the rearward downwardly inclined guide ends 103, the upper end of the tilting linkage 220 descends and the upper end of the tilting reflective plate 120 is pushed rearward.

More specifically, when the upper end of the tilting linkage 220 descends, the upper end of the tilting reflective plate 120 connected by the tilting linkage 220 and the pivot shaft 222 pivots rearward about the lower hinge pins 212.

Thus, as shown in FIG. 8B, the tilting reflective plate 120, bonded to the tilting reflective plate 120, is tilted from the rear side of the fixed reflective plate 110 and lowers the reflectivity of light entering from the rear side.

As such, since the rear side object (for example, a following vehicle) entering from the rear side passes through the transparent fixed plate 110 is focused on the tilting reflective plate 120 tilted rearward, and at the same time reflectivity of the rear light (for example, light from headlamps of the following vehicles) entering the tilting reflective plate 120 from the rear side is lowered, a driver may be prevented from being blinded during night driving.

Although the present invention has been described in detail until now, the scope of the present invention is not limited to the description but various modifications made by those skilled in the art using the basic concept of the present invention defined by the claims also fall within the scope of the present invention.

What is claimed is:

1. An inside mirror assembly of a vehicle comprising:
   a housing having an opening formed in a front side thereof;
   a fixed reflective plate fixed in the opening of the housing;
   a tilting reflective plate in the housing, disposed parallel to a rear side of the fixed reflective plate when in a day reflection mode, or disposed such that an upper end thereof is tilted rearward by an angle about the lower end to reduce light reflectivity when in the night reflection mode; and
   a tilting mechanism connected to the tilting reflective plate and mounted inside and outside of the housing to adjust a tilting angle of the tilting reflective plate;
   wherein the tilting mechanism comprises:
   a tilting plate bonded to the rear side of the tilting reflective plate;
   a tilting linkage having an upper end hinged to the upper side of the tilting plate and a lower end formed with a spring coupling unit;
   a spring engaged with the tilting linkage and pivotally supported by spring supporting ends formed in the housing;
   a tilting lever moving the lower end of the tilting linkage forward and rearward;
   guide ends upwardly inclined toward a front side of the inside mirror assembly and integrally formed on a bottom of the housing, wherein the tilting linkage is lifted during a forward movement of the tiling linkage and lowered during a rearward movement of the tilting linkage; and
   locking steps integrally formed on upper sides of the guide ends to provide to a user an operative feeling when the user manipulates the tilting linkage forward and rearward.

2. The inside mirror assembly of claim 1, wherein the spring is inserted into a spring coupling slot and having both ends pivotally supported by spring supporting ends formed on the wall of the housing.

3. The apparatus of claim 1, wherein the spring comprises a linear rod coupled with the tilting lever and inserted into the spring coupling slot and supporting rods bent from both ends of the linear rod twice and pivotally supported by the spring supporting ends.

4. The inside mirror assembly of claim 1, wherein the upper end of the tilting linkage is hinged by pivot shaft formed on the rear upper side of the tilting plate and a lower end on which the spring coupling slot is formed as a spring coupling unit for coupling the spring.

5. The inside mirror assembly of claim 1, wherein upwardly inclined guide ends are integrally formed on the bottom of the housing forward such that the tilting linkage is lifted during the forward movement of the tilting linkage and is lowered during the rearward movement.

6. The inside mirror assembly of claim 5, further comprising locking steps integrally formed on the guide ends to provide operative feeling to a user during the forward and rearward movements of the tilting linkage.

7. The inside mirror assembly of claim 1, further comprising lever hinge supporting ends into which the lever hinges of the tiling lever are integrally formed on the bottom of the housing.

8. The inside mirror assembly of claim 1, wherein the tilting lever is coupled with the spring to move the lower end of the tilting linkage forward and rearward.

9. The inside mirror assembly of claim 1, wherein the tilting lever includes an upper end having a coupling recess, into which the spring is inserted, integrally protruding and the lower side integrally formed with a lever handle extending outwardly through the bottom of the housing.

10. The inside mirror assembly of claim 1, wherein the fixed reflective plate is made of transparent plastic of a prescribed thickness.

11. The inside mirror assembly of claim 1, wherein the four edges of the fixed reflective plate are curved rearward and are integrally bonded to the opening of the housing to form a frameless structure.

12. The inside mirror assembly of claim 1, wherein the tilting reflective plate includes a front side made of a plastic material coated with reflective material of a prescribed thickness.

* * * * *